(12) United States Patent
King (10) Patent No.: US 8,839,435 B1
(45) Date of Patent: Sep. 16, 2014

(54) EVENT-BASED ATTACK DETECTION

(75) Inventor: Paul King, Glos (GB)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 13/289,147

(22) Filed: Nov. 4, 2011

(51) Int. Cl.
*H04L 29/06* (2006.01)

(52) U.S. Cl.
USPC .................................. 726/24; 726/22; 726/23

(58) Field of Classification Search
USPC ....................................................... 726/22–24
See application file for complete search history.

(56) References Cited

U.S. PATENT DOCUMENTS 7,647,622 B1 * 1/2010 Sobel et al. ........................ 726/1
7,908,660 B2 * 3/2011 Bahl ................................ 726/25
2004/0044912 A1 * 3/2004 Connary et al. ............... 713/201
2006/0236392 A1 * 10/2006 Thomas et al. ................. 726/23
2010/0083382 A1 * 4/2010 Farley et al. .................... 726/24

* cited by examiner

*Primary Examiner* — Kambiz Zand
*Assistant Examiner* — Ali Shayanfar
(74) *Attorney, Agent, or Firm* — Edwards Wildman Palmer LLP; James M. Behmke; Stephen D. LeBarron (57) ABSTRACT

Event-based attack detection is described. In some implementations, an attack on a computing device can be detected by identifying unusual events, or unusual sequences of events, that occurred on the computing device. A computing device can log events that occur on the computing device. In some implementations, the unusualness of an event, or sequence of events, on the computing device can be determined based on a comparison of events logged by the computing device and events logged by other computing devices. Other implementations are described.

30 Claims, 7 Drawing Sheets

EVENT-BASED ATTACK DETECTION

TECHNICAL FIELD

The present disclosure generally relates to detecting attacks on computer systems.

BACKGROUND

Mechanisms for protecting computing devices against malware often rely on having some prior knowledge of an attack vector and/or exploit mechanism. The protection mechanism might take the form of an operating system vendor fixing a vulnerability, or it might be a software vendor (e.g., antivirus, anti-malware vendor) producing a signature to recognize the malware. The protection might involve a web proxy that protects against known infected websites or known attack vectors. These protection mechanisms rely on having some prior knowledge of the attack. This means that the mechanism cannot protect an end point (e.g., terminal computer) against a previously unknown attack. For instance, if the vulnerability is not known to an operating system vendor then the vendor cannot update the operating system to prevent future attacks. If the malware has never been seen before there will not be a signature that can be used in anti-virus or anti-malware software.

DETAILED DESCRIPTION

Event-based attack detection is described. In the following description, for the purposes of explanation, numerous specific details are set forth in order to provide a thorough understanding of event-based attack detection.

Implementations are described herein according to the following outline:

1.0 General Overview
2.0 Description of Particular Implementations
3.0 Event-Based Attack Detection
   3.1 Detecting Unusual Events
   3.2 Determining a Risk Factor
   3.3 Determining a Risk Rating
4.0 Implementation Mechanisms—Hardware Examples
5.0 Extensions and Alternatives

1.0 General Overview

Event-based attack detection is described. In some implementations, an attack on a computing device can be detected by identifying unusual events, or unusual sequences of events, that occurred on the computing device. A computing device can log events that occur on the computing device. In some implementations, the unusualness of an event, or sequence of events, on the computing device can be determined based on a comparison of events logged by the computing device and events logged by other computing devices.

In an implementation, a method to detect a malware attack on a computing device can include accessing information about event logs that correspond to the event logs of respective computing devices. The event log information can be used to identify an unusual event or an unusual sequence of events. A database can be accessed to obtain one or more risk factors for a malware attack on a computing device. A determination can be made whether the unusual event or the unusual sequence of events satisfies at least one of the risk factors in the database and when at least one of the risk factors is satisfied, verifying whether the unusual event or the unusual sequence of events is the malware attack.

In some implementations, identifying the unusual event or the unusual sequence of events can include identifying a number of events that are less than a threshold number of events. In some implementations, identifying the unusual event or the unusual sequence of events can include identifying a percentage of events that are less than a threshold percentage of events.

In some implementations, verifying whether the unusual event or the unusual sequence of events is a malware attack can include assigning a risk rating count to account for a number of the risk factors for the unusual event or an unusual sequence of events and determining if the unusual event or the unusual sequence of events satisfies at least a threshold amount of the risk rating count for the number of the risk factors. The information for the unusual event or the unusual sequence of events can be associated with a malware attack based on the determination that the risk rating count satisfies at least the threshold amount. The information can be used to determine whether the unusual event or the unusual sequence of events is not a malware attack.

In some implementations, verifying whether the unusual event or the unusual sequence of events is a malware attack can include assigning a risk rating corresponding to the unusual event or an unusual sequence of events, determining whether the unusual event or the unusual sequence of events in the stored event logs satisfies one of the risk factors and adjusting the risk rating based on whether the risk factor is satisfied. In some implementations, verifying can include determining if the unusual event or the unusual sequence of events satisfies at least a threshold for the risk rating for the malware attack, determining that the unusual event or the unusual sequence of events is the malware attack based upon satisfying at least the threshold, and determining that the unusual event or the unusual sequence of events is not the malware attack based upon not satisfying the threshold.

In some implementations, adjusting the risk rating can include increasing the risk rating based upon the determination that the risk factor is satisfied and decreasing the risk rating based upon the determination that the risk factor is not satisfied. The risk rating can be adjusted based on whether each of the respective risk factors is satisfied.

In some implementations, the method can include receiving information for the threshold amount and enabling the threshold amount to be a variable threshold amount. The method can include receiving, through a graphical user interface (GUI), a user input for varying the threshold amount for the computing device; and determining that the threshold amount is to be varied based on the received user input.

Some implementations can provide for detecting intrusions and/or malware attacks on a computing device while reducing the number of false positive detections by determining whether an unusual event on one device has occurred on other devices.

Other implementations encompass a computer apparatus and a computer-readable medium configured to carry out the foregoing steps.

2.0 Description of Particular Implementations

Figure 1:
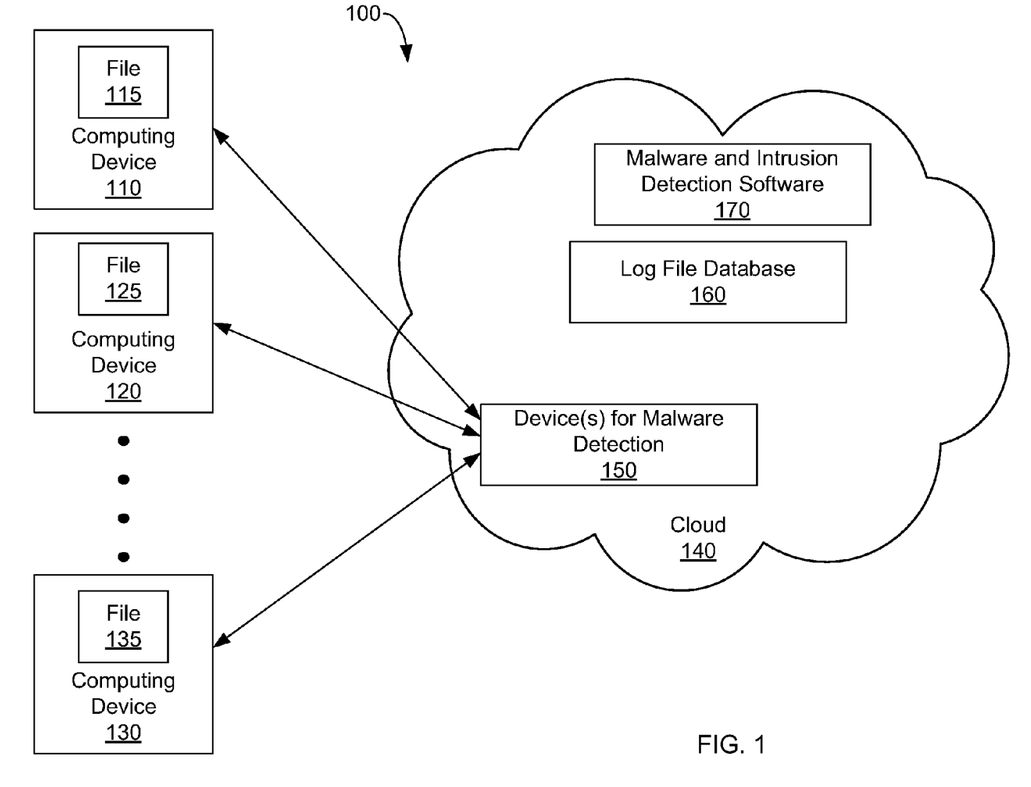
FIG. 1 illustrates an example of a system for detecting attacks.

FIG. 1 illustrates an example of a system 100 for detecting malware attacks on a computing device. The following description relates to the implementation shown by FIG. 1, noting a specific architecture and components and configurations thereof, as exemplary. As illustrated, system 100 can include computing devices 110, 120 and 130. For example, computing devices 110, 120 or 130 can be terminal computing devices (e.g., a desktop computer, laptop, mobile phone, smartphone), or network elements (e.g., a router or a switch). Computing devices 110, 120 and 130 configured to monitor events that occur within each respective computing device. For example, in FIG. 1, computing device 110 can be configured to monitor events that occur within computing device 110. Similarly, computing device 120 and computing device 130 can be configured to monitor events that occur within computing device 120 and computing device 130, respectively. If computing device 110 is a terminal device (e.g., a personal computer, mobile phone, smartphone, etc.) computing device 110 can monitor and log events, including downloading, installing, and executing processes, processing requests and/or performing various other operations involving system resources (e.g., system calls, memory usage, cpu usage, etc.) at device 110. If computing device 110 is a network element (e.g., a router or a switch) computing device 110 can monitor and log events, including network flow data (e.g., traffic shaping, accounting, security activities), IP addresses, packet data and/or routing information.

In some implementations, computing devices 110, 120 and 130 can log events that occur within each respective computing device. An event can be an operation performed within the computing device or a change in state of the computing device. For example, events can include attaching hardware (e.g., a universal serial bus (USB) drive, a printer, a camera, etc.), installing software (e.g., downloading software from a network or local storage device), system errors (e.g., bus overflow, memory access errors, etc.), permission changes (e.g., elevation of user permissions), memory access and/or file access events. Computing devices 110, 120 and 130 can log the occurrence of events within their respective log files 115, 125 and 135, for example.

In some implementations, computing devices 110, 120 and 130 can transmit their respective log files 115, 125 and 135 to one or more malware detection devices 150. For example, malware detection devices 150 can be cloud-based devices (e.g., hosted in network cloud 140) capable of detecting malware according to implementations disclosed herein. In some implementations, malware detection devices 150 can collect event log files from multiple devices and perform analysis on the events logged within the log files using malware and intrusion detection software 170 to detect an intrusion or malware attack on one or more of the computing devices 110, 120 and 130. For example, malware and intrusion detection software 170 can be hosted on malware detection devices 170 and/or in network cloud 140.

In some implementations, malware detection devices 150 can store received event log files in log file database 160. For example, log file database 160 can be a cloud-based (e.g., hosted in network cloud 140) database. Log files (e.g., log files 115, 125 and 135) can be stored in database 160. Software 170 can analyze the events in the stored log files to determine which events, or sequences of events, indicate an intrusion or malware attack on a computing device. In some implementations, software 170 can analyze the event log files to identify unusual events or unusual sequences of events that indicate an intrusion and/or malware attack. For example, a malware attack can be detected by analyzing event log files for a sequence of events that resulted in a harmful executable file being installed and/or executed on a computing device. An intrusion can be detected by analyzing the event log file for successive lookups against an Active Directory, for example. As another example, malicious activity can be detected by analyzing the event log files of a network element (e.g., router) to determine if a computer is scanning other users on the network. In some implementations, malware detection devices 150 and/or malware and intrusion detection software 170 can perform the steps described in FIGS. 3-6, below.

Figure 2:
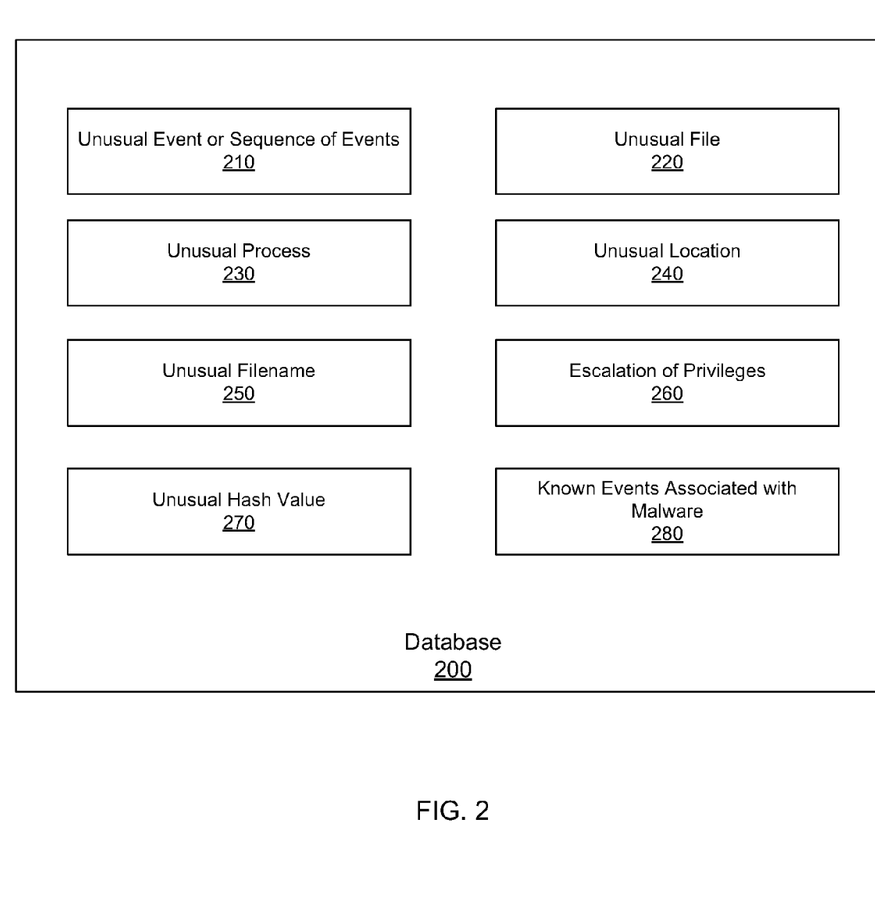
FIG. 2 illustrates an example of a database used by the system for detecting attacks.

FIG. 2 illustrates an example of a database 200 for detecting intrusions and/or malware attacks on computing devices. For example, database 200 can be hosted in network cloud 200. In some implementations, database 200 can store information relating to risk factors that can be used for detecting an intrusion and/or malware attack, as described in FIGS. 3-6, below. A risk factor can be a characteristic of an event that indicates that the event may be associated with an intrusion and/or malware attack. Each risk factor stored in database 200 can be associated with a value (e.g, a count, a percentage, etc.) that can be used alone or can be combined with other risk factor values to determine whether an intrusion and/or malware attack has occurred, as disclosed in further detail below.

In some implementations, database 200 can include unusual event or sequence of events risk factor 210. For example, an unusual event can be identified in a single event log file from a single computing device. An unusual event can be identified by analyzing event log files from multiple computing devices. An unusual event can be identified by analyzing event log files stored in database 160. If a particular event rarely occurs (e.g., does not regularly occur during normal operation of computing devices 110, 120 and 130), then the event can be identified as an unusual event. An unusual or rare event can be identified by determining how frequently a particular event appears in the event log files of computing devices 110, 120 and 130. For example, if an event occurs in the log files for all (e.g., combined total) computing devices less than a threshold number of times (i.e., frequency threshold), the event can be determined to be a rare or unusual event. The frequency threshold can be configured, for example, through a user interface of software 170.

In some implementations, by comparing an event from one computing device to events logged for many computing devices, false positives for unusual events can be reduced. That is, if an event appears rare or unusual for one device but can also be found in many other devices, then the event can be identified as not associated with an intrusion and/or malware attack. However, if the event only occurs on one of the computing devices and does not show up in the log files for any other computing device (or only shows up a few times in other log files or in a small number of log files of other computing devices) then the event can be identified as an unusual event and can be associated with an intrusion and/or malware attack.

Similarly to individual events, if a particular sequence of events rarely occurs, then the sequence of events can be identified as an unusual sequence of events. For example, event A, event B and event C may individually be common events on a computer system. However, the sequence of events B-A-C may be an unusual sequence of events if the particular sequence B-A-C does not commonly occur during the normal operation of a computing device. The unusualness of the sequence of events (e.g., B-A-C) can be determined by analyzing event logs from many computing devices. The unusualness of the sequence of events can be determined by analyzing the event logs that are stored in database 160. For example, if a particular sequence of events is only found in the log files for one computing device and not found in the log files for other computing devices, the particular sequence of events can be identified and associated with an intrusion and/or malware attack.

In some implementations, database 200 can include an unusual file risk factor 220. For example, a file downloaded or installed on a computing device can be logged in an event log file. The file type associated with the file can also be logged in the event log file. If the file is associated with an unusual file type, the file can be associated with an intrusion and/or malware attack. If the event log files of a computing device include a file of an unusual type then the unusual file risk factor can be satisfied.

In some implementations, database 200 can include an unusual process risk factor 230. For example, a process executed or running on a computing device can be logged in an event log file. The process can be compared with processes logged for other computing devices. For example, the name of the process can be compared to names of processes in event log files of other devices to determine the unusualness of the process name or to determine whether the process name is a variation of a known process name. For example, if the process name is a variation of a known process name, then the process name may be an attempt to mislead a user into thinking that the process is a legitimate process. If the process name cannot be found (or is rarely found) in the log files of other computing devices, the process can be associated with an intrusion and/or malware attack. If the event log files of a computing device include the execution of an unusual process then the unusual process risk factor can be satisfied.

In some implementations, database 200 can include an unusual location risk factor 240. For example, a process having a common name but running from an unusual location can indicate an intrusion and/or malware attack. Similarly, a file having a common name but stored in an unusual location can indicate an intrusion and/or malware attack. The process or file may be named identically to a common process or file but stored in a location that is uncommon. The fact that the process or file is stored in an unusual location can indicate that the file or process is not the file or process indicated by the file or process name. If an event log file indicates that a file or process is stored in an unusual location then the unusual location risk factor can be satisfied.

In some implementations, database 200 can include an unusual filename risk factor 250. For example, a file or process may have a name that looks similar to a common file or process name but is slightly different. The creator of the file or process can name a malware file or process such that at first glance it looks like a common process or file. For example, myprocess.exe may be a common file name. In an attempt to trick a user of an infected system, a malware creator may name a file miprocess.exe. At first glance myprocesses.exe and miprocess.exe may appear to be the same legitimate file. However, when miprocess.exe is executed in may cause harm to the computing device upon which it executes. If an unusual file name is detected in an event log file of a computing device then the unusual file name risk factor can be satisfied.

In some implementations, database 200 can include an escalation of privileges risk factor 260. For example, a malware process may cause a change in the privileges granted to a user, process or computing device. The change in privileges is often an unauthorized change and may allow a user, process or system to access data or perform operations that would be harmful to the host computing device. If an unauthorized escalation of privileges event is detected in the event log files of a computing device then the escalation of privileges risk factor can be satisfied.

In some implementations, database 200 can include an unusual hash value risk factor 270. For example, some systems use hash values to validate files and/or processes. A file or process can be hashed according to a hashing function to generate a hash value. If the value generated does not match the expected hash value for the particular file or process, then the file or process can be identified as having an unusual hash value.

In some implementations, database 200 can include a known malware events risk factor 280. For example, events, or sequences of events, that have been previously identified as associated with an intrusion and/or malware attack can be stored in database 200 as known malware events. If one of these known malware events, or sequence of events, is detected in an event log file then the known malware events risk factor can be satisfied.

3.0 Event-Based Attack Detection

In some implementations, the event-based attack detection described herein can identify previously unknown intrusions and/or malware attacks on a computing device while reducing the number of false positive attack identifications. One of the ways that the intrusion and malware attack detection system can reduce the number false positives is by collecting event data from a large quantity (e.g., thousands, millions) of computing devices and comparing seemingly unusual events from a single computing device to the events observed by all computing devices providing event log data. Comparing can be performed, for example, by determining how many times the seemingly unusual event occurs in the log files of other computing devices. For example, if a particular process appears to be unusual for a particular computing device the process can be positively identified as an intrusion and/or malware attack. However, of the particular process is readily found amongst many other computing devices, the identification of the process can be recognized as a false positive for an intrusion and/or malware attack and disregarded. Thus, false positives for intrusions and/or malware attacks can be reduced. Factors other than an unusual process can be used to detect intrusions and/or malware attacks (e.g., the factors listed above with reference to FIG. 2).

3.1 Detecting Unusual Events

Figure 3:
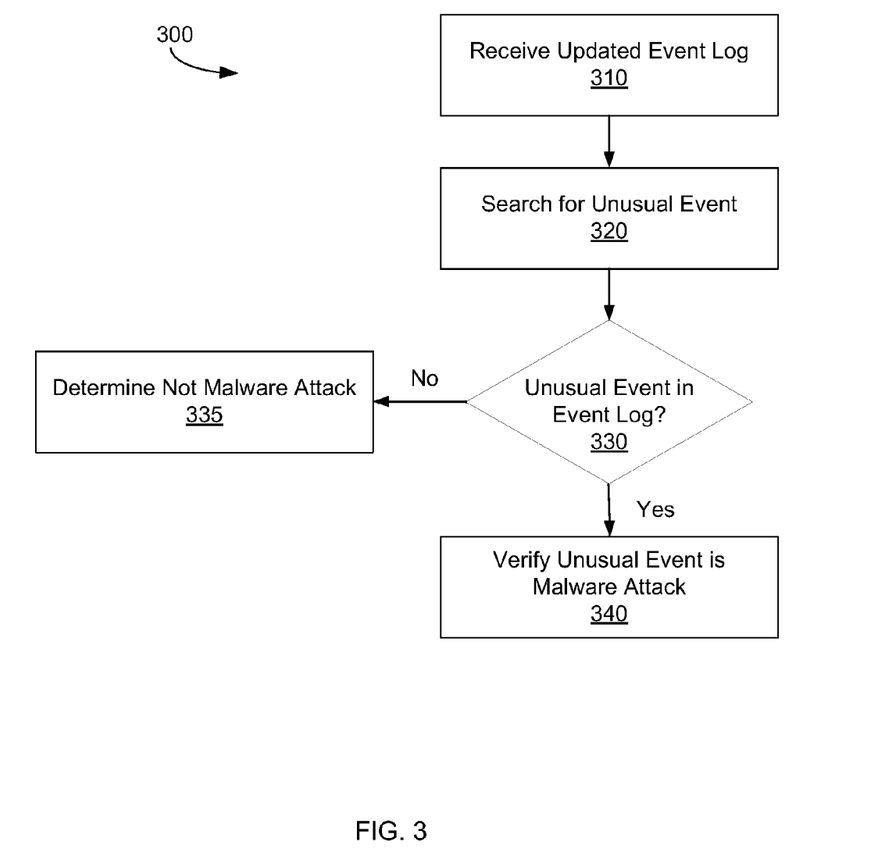
FIG. 3 illustrates an example of detecting unusual events in event logs.

FIG. 3 illustrates an example process 300 for detecting unusual events in event logs. At step 320, an updated event log can be received. For example, the updated event log can be received by malware detection devices 150. The updated event log can be received from computing device 110, 120 or 130, for example. In some implementations, the updated event log can be transmitted from computing devices 110, 120, or 130 as the events occur. In some implementations, the updated event log can be transmitted from computing devices 110, 120, or 130 on a regular time interval (e.g., every 5 minutes). The updated event log can include a record of the events that occurred on a computing device (e.g., device 110, 120, 130) since the previous updated event log was transmitted by the computing device to malware detection devices 150. In some implementations, the received updated log file can be stored in database 160.

At step 320, the received updated event log can be searched for unusual events. For example, malware detection devices 150 and/or malware and intrusion detection software 170 can search the received updated event log to find or identify unusual events recorded in the log. An unusual event identified at step 320 can be an event that is unusual for the particular computing device that transmitted the event log to malware detection devices 150. An unusual event can be an event that is unusual for all computing devices as determined based on all event logs received from all computing devices and/or stored in database 160. For example, an unusual event can be an event or sequence of events that occurs very few times in the event logs of the computing devices. In some implementations, if an event, or sequence of events, occurs less than a configured number of times in all event logs, then the event or sequence of events can be identified as an unusual event. In some implementations, an unusual event, or sequence of events, can be associated with one of the factors described with reference to FIG. 2. For example, an unusual event can be associated with or correspond to unusual filename factor 250 or unusual location factor 240.

At step 330, a determination is made whether there are any unusual events in the received updated event log. If there are no unusual events found in the event log, then at step 335 it can be determined that there was not a malware attack on the transmitting computing device.

At step 340, if an unusual event is found in the event log, then the event can be verified as being associated with an intrusion and/or malware attack. For example, the unusual event can be compared to the events in event logs of other computing devices to determine if other computing devices have logged the same unusual event. If the same unusual event is found in other event logs of other computing devices, the unusual event can be identified as a false positive for a malware attack and can be disregarded.

3.2 Determining a Risk Factor

Figure 4:
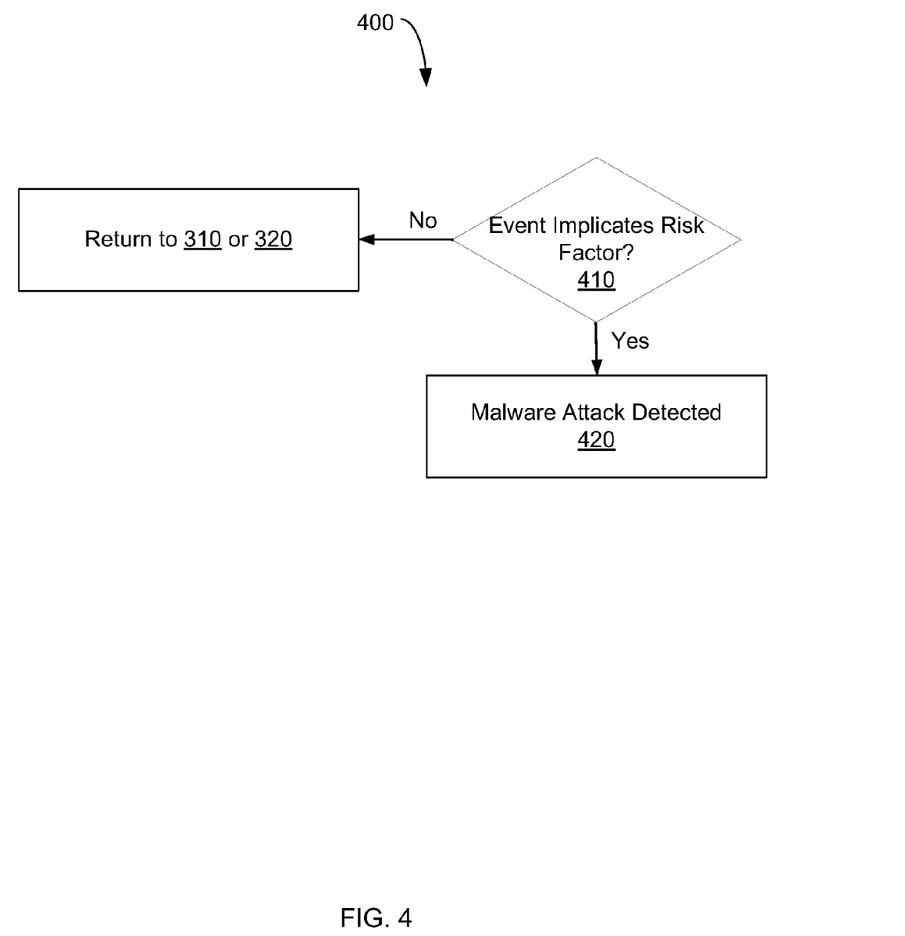
FIG. 4 illustrates an example of determining a risk factor for an event.

FIG. 4 illustrates an example process 400 for determining a risk factor for an event. In some implementations, if an event satisfies a risk factor (e.g., one or more of the risk factors described with reference to FIG. 2) then a malware attack can be detected.

At step 410, a determination can be made whether the unusual event satisfies a risk factor. For example, the unusual event found by the process of FIG. 3 can be analyzed to determine whether the unusual event fits or matches one or more of the risk factor categories described with reference to FIG. 2. For example, the unusual event can be matched to the escalation of privileges risk factor 260. The determination can be made based on the individual event logs provided by a particular computing device. The determination can be made based on the event logs received from all computing devices. For example, the determination can be made based on all of the event logs from all computing devices stored in database 160. If the unusual event does not satisfy any risk factor, the process can return to step 310 or step 320 of FIG. 3.

At step 420, if the unusual event from FIG. 3 satisfies a risk factor, then a malware attack can be detected. For example, if the unusual event falls within one of the risk factor categories then the unusual event can be identified as associated with an intrusion and/or malware attack on the computing device that provided the event log.

3.2 Determining a Risk Rating

In some implementations, a risk rating can be calculated and used to determine whether a computing device has been subject to an intrusion and/or malware attack. For example, the risk rating can be calculated based on multiple events and multiple risk factors. The risk rating can be calculated based on a count, value or percentage associated with each risk factor. In some implementations, an intrusion and/or malware attack can be detected if the risk rating exceeds a threshold value. For example, the threshold value can be a configurable count value or percentage value that can be used to determine that an intrusion and/or malware attack has occurred.

Figure 5:
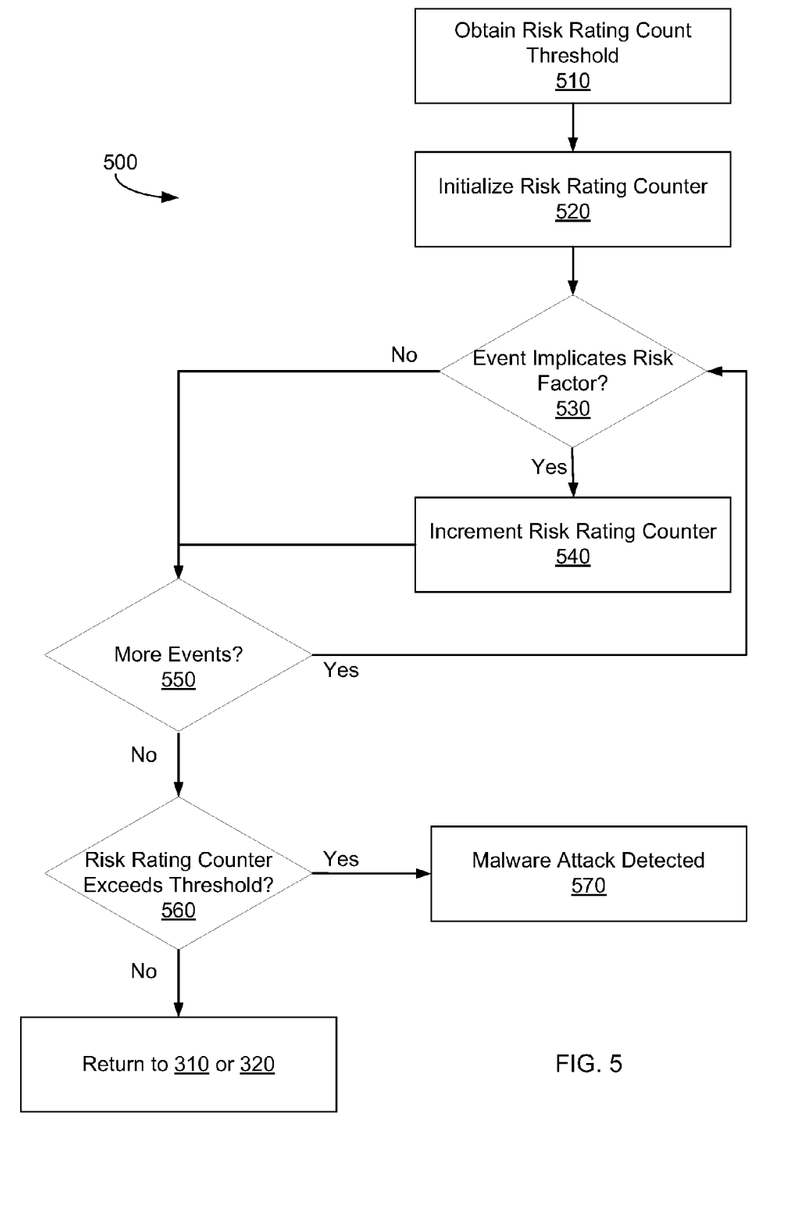
FIGS. 5 and 6 illustrate examples of determining a risk rating for events.

FIG. 5 illustrates an example process 500 for determining a risk rating for events based on a risk factor count. For example, each risk factor (e.g., the risk factors of FIG. 2) can be associated with a count value. Each risk factor can have a count value of 1. Each risk factor can have a weighted value so that each risk factor contributes a different value to the risk rating. For example, one risk factor can be configured to have a count value of one while another risk factor can be configured to have a count value of six. Thus, each risk factor can be weighted according to how likely the presence of a particular risk factor indicates an intrusion and/or malware attack.

At step 510, a risk rating count threshold can be obtained. For example, the risk rating count threshold can be a value indicating the number of risk factors that need to be found in an event log before an intrusion or malware attack is detected. In some implementations, the risk rating count threshold can be a user configurable value. For example, the risk rating count threshold can be a configurable value supplied by a user through a user interface of malware and intrusion detection software 170 of FIG. 1.

At step 520, a risk rating counter can be initialized. For example, the risk rating counter can correspond to the number of risk factors found in an event log file. The risk rating counter can correspond to a summation of the weighted count values associated with each risk factor. The risk rating counter can be initialized to zero when beginning to analyze an event log to determine whether an intrusion and/or malware attack has occurred on a computing device.

At step 530, a determination can be made whether an event satisfies one or more risk factors. For example, each event found in an event log can be analyzed to determine whether the event satisfies one or more of the risk factors stored in database 200 of FIG. 2.

At step 540, the risk rating counter can be incremented. For example, if an event satisfies one or more of the risk factors stored in database 200, the risk rating counter can be incremented for each risk factor satisfied by the event. If one event satisfies two risk factors, then the one event can cause the risk rating counter to be incremented twice. In some implementations, the risk rating counter can be incremented by a value of one for each risk factor satisfied. In some implementations, the risk rating counter can be incremented according to count values associated with each risk factor. For example, if a particular risk factor has an associated count value of six, then the risk rating counter can be incremented by a value of six. Thus, each risk factor can be weighted by assigning various count values to risk factors.

At step 550, a determination can be made whether there are more events in the event log. For example, if the event log contains more events that have not yet been analyzed to determine whether they satisfy a risk factor, the process 500 can loop through steps 530, 540 and 550 until all of the events in the event log have been analyzed. If there are no more events in the event log that need to be analyzed, then the process can proceed to step 560.

At step 560, a determination can be made whether the risk rating counter has exceeded the risk rating count threshold. For example, the risk rating counter can be compared to the risk rating count threshold obtained at step 510. If the risk rating counter value is greater than the risk rating count threshold value, an intrusion and/or malware attack can be detected. In some implementations, the risk rating counter value can be compared to the risk rating count threshold value after each time the risk rating counter is incremented at step 540. For example, efficient by comparing the threshold value to the counter value after each time the counter is incremented the process 500 may avoid wasting time and processing cycles analyzing additional events after the threshold for intrusion and/or malware detection is met. If the risk rating counter value has not exceeded the risk rating count threshold, the process can return to step 310 or step 320 of FIG. 3. If the risk rating counter value is greater than the risk rating count threshold value, then at step 570, a malware attack can be detected.

Figure 6:
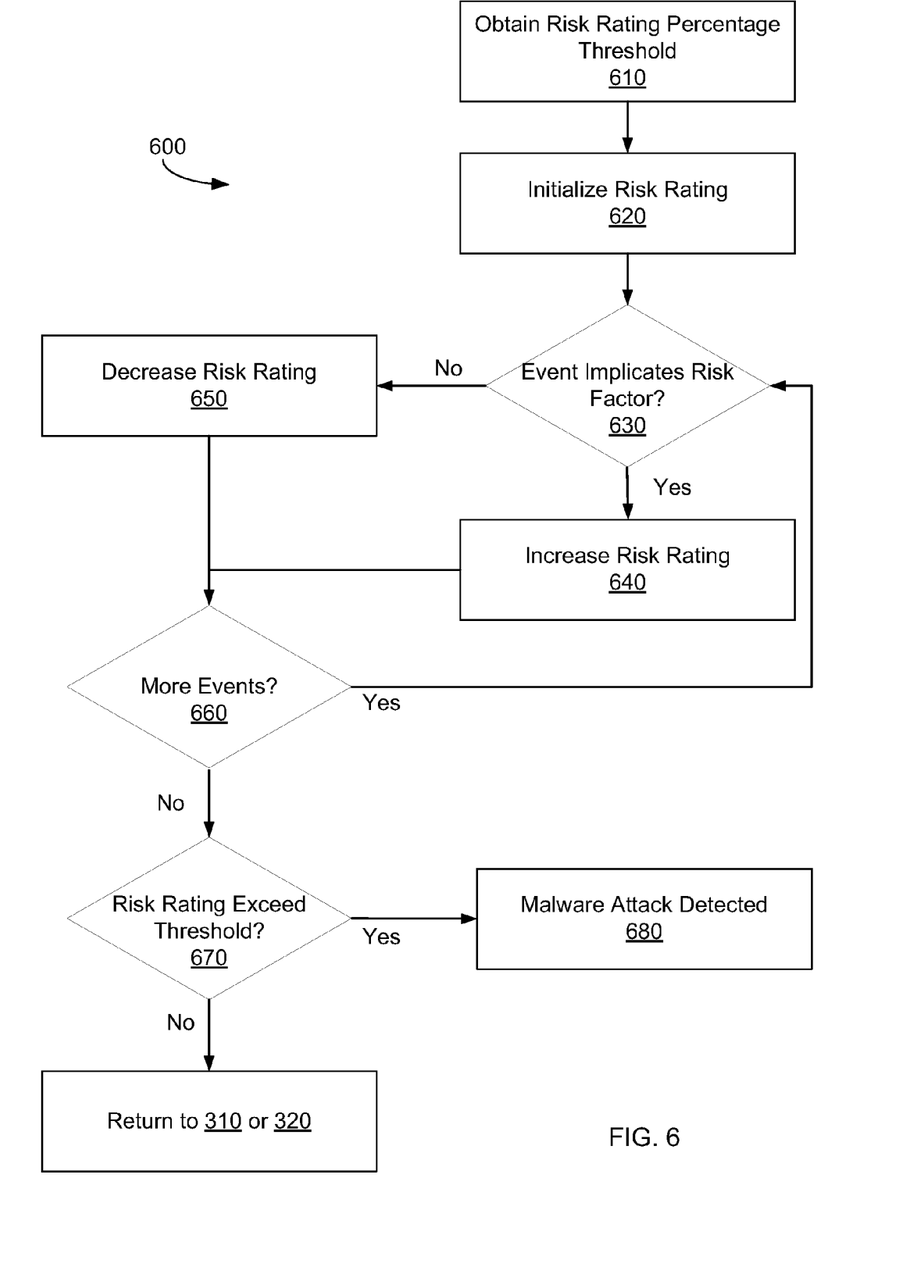

FIG. 6 illustrates an example process 600 for determining a risk rating for events in an event log based on a percentage associated with risk factors associated with events. In some implementations, a percentage value can be assigned to or configured for each risk factor in database 200 of FIG. 2. The percentage can correspond to a probability or likelihood that a particular risk factor is associated with an intrusion and/or malware attack. Multiple percentages from multiple risk factors can be combined to calculate an overall probability or risk rating that indicates that an intrusion and/or malware attack has occurred on the computing device that provided the event log. In some implementations, the risk rating can be increased for each risk factor found in an event log. In some implementations, the risk rating can be decreased when an event in the event log does not satisfy at least one of the risk factors.

At step 610, a risk rating percentage threshold can be obtained. For example, the risk rating threshold can be a percentage value. The risk rating percentage threshold can correspond to a probability or likelihood that an intrusion and/or malware attack has occurred on the computing device associated with the log file being analyzed. For example, the risk rating percentage threshold can be a configurable percentage value supplied by a user through a user interface of malware and intrusion detection software 170 of FIG. 1.

At step 620, a risk rating can be initialized. For example, the risk rating can be a percentage value indicating the probability that the events in an event log are associated with an intrusion and/or malware attack. In some implementations, the risk rating can be initialized to zero. In some implementations, the risk rating can be initialized to a risk rating calculated for a previous event log. For example, if a previous event log was analyzed and a risk rating of 60% was determined for the previous event log, then at step 620, the risk rating for the current event log can be initialized to 60%.

At step 630, a determination can be made whether an event satisfies a risk factor. For example, each event in an event log can be analyzed to determine whether the event satisfies a risk factor, as described above.

At step 640, the risk rating can be increased. For example, if an event satisfies a risk factor, the risk rating can be increased according to the percentage value associated with the particular risk factor. Riskier or more unusual events, or sequences of events, can generate higher risk ratings than common events or sequences of events.

At step 650, the risk rating can be decreased. For example, if an event does not satisfy a risk factor, the risk rating can be decreased according to a percentage value. The amount that the risk rating can be decreased based on a non-risk factor event can be a configurable value. For example, the percentage to decrease the risk rating for non-risk factor events can be configured by a user through a user interface of malware and intrusion detection software 170. The risk rating can be decreased to indicate that the event makes it less likely that an intrusion and/or malware attack has occurred.

At step 660, a determination can be made whether more events exist in the event log. For example, if more events are determined to exist in the current event log, then process 600 can repeat or loop through steps 630, 640, 650 and 660 until all of the events in the current event log have been analyzed to determine whether the events correspond to one of the risk factors discussed above.

At step 670, a determination can be made whether the risk rating has exceeded the risk rating percentage threshold. For example, the risk rating calculated for the event log can be compared to the risk rating percentage threshold. If the calculated risk rating is not greater than the risk rating percentage threshold, then the process can return to step 310 or 320 of FIG. 3. If the calculated risk rating is greater than the risk rating percentage threshold, then a malware attack can be detected at step 680.

4.0 Implementation Mechanisms

Hardware Examples

Figure 7:
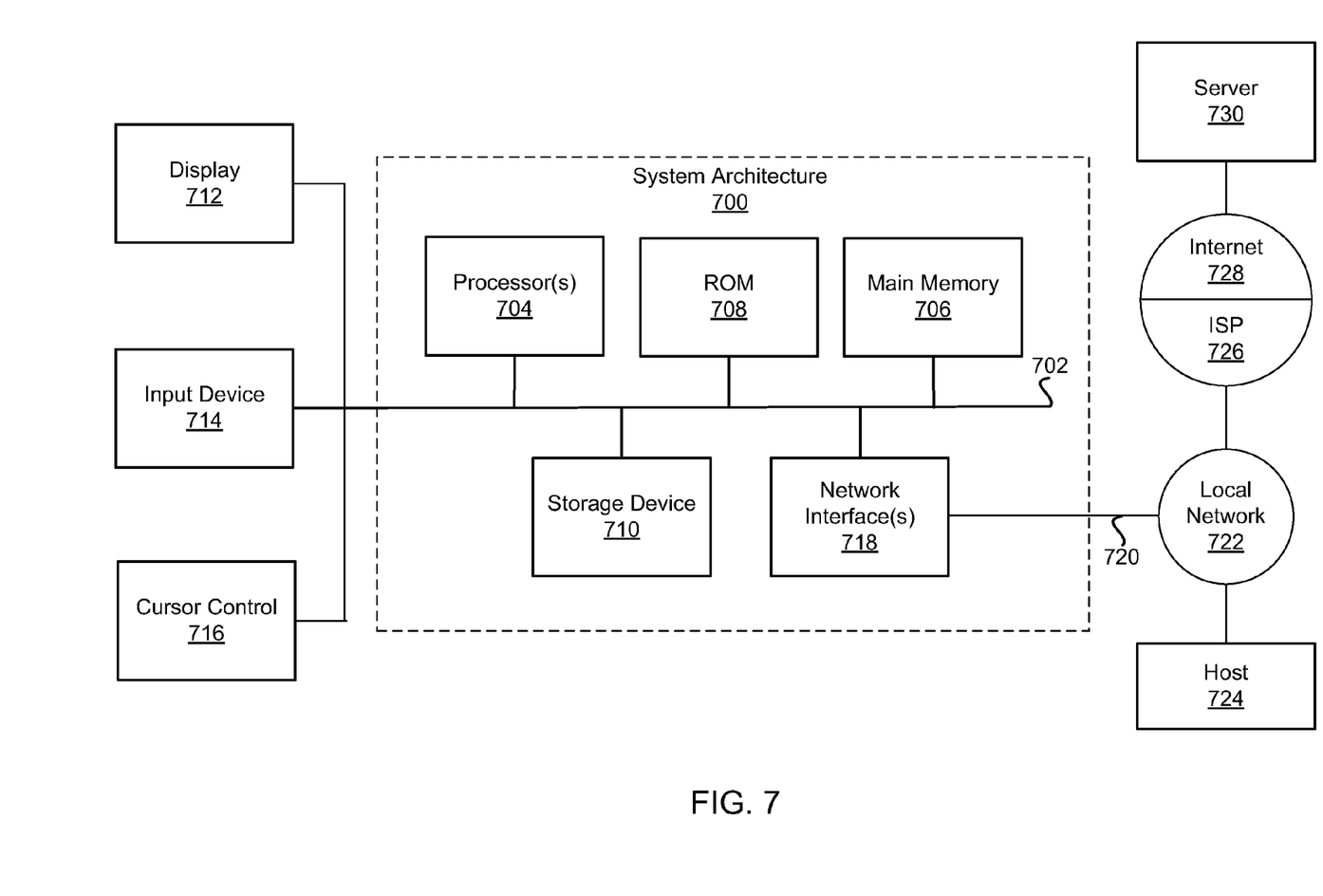
FIG. 7 illustrates an example of a computer system upon which an implementation can be implemented.

FIG. 7 is a block diagram that illustrates a computer system 700 that can be configured to implement the features described with reference to FIGS. 1-6. Computer system 700 includes a bus 702 or other communication mechanism for communicating information, and a processor 704 coupled with bus 702 for processing information. Computer system 700 also includes a main memory 706 (e.g., a random access memory (RAM) or other dynamic storage device) coupled to bus 702 for storing information and instructions to be executed by processor 704. Main memory 706 also can be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710 (e.g., a magnetic disk or optical disk) is provided and coupled to bus 702 for storing information and instructions.

Computer system 700 can be coupled via bus 702 to a display 712 (e.g., a liquid crystal display (LCD), a cathode ray tube (CRT), etc.) for displaying information to a computer user. An input device 714, including alphanumeric and other keys, is coupled to bus 702 for communicating information and command selections to processor 704. Another type of user input device is cursor control 716 (e.g., a mouse, a trackball, or cursor direction keys, etc.) for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Some implementations include the use of computer system 700 for performing techniques described herein. According to one implementation, the techniques described herein are performed by computer system 700 in response to processor 704 executing one or more sequences of one or more instructions contained in main memory 706. Such instructions can be read into main memory 706 from another machine-readable medium, such as storage device 710. Execution of the sequences of instructions contained in main memory 706 causes processor 704 to perform the process steps described herein. In alternative implementations, hard-wired circuitry can be used in place of or in combination with software instructions. Thus, implementations are not limited to any specific combination of hardware circuitry and software.

The term "machine-readable medium" as used herein refers to any medium that participates in providing data that causes a machine to operation in a specific fashion. In an implementation including computer system 700, various machine-readable media are involved, for example, in providing instructions to processor 704 for execution. Such a medium can take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media can be involved in carrying one or more sequences of one or more instructions to processor 704 for execution. For example, the instructions can initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 can optionally be stored on storage device 710 either before or after execution by processor 704.

Computer system 700 can also include a network interface 718 coupled to bus 702. Network interface 718 provides a two-way data communication coupling to a network link 720 that is connected to a local network 722. For example, network interface 718 can be an integrated services digital network (ISDN) card or a modem to provide a data communication connection to a corresponding type of telephone line. As another example, network interface 718 can be a local area network (LAN) card to provide a data communication connection to a compatible LAN. Wireless links can also be implemented. In any such implementation, network interface 718 sends and receives electrical, electromagnetic or optical signals that carry digital data streams representing various types of information.

Network link 720 typically provides data communication through one or more networks to other data devices. For example, network link 720 can provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through network interface 718, which carry the digital data to and from computer system 700, are exemplary forms of carrier waves transporting the information.

Computer system 700 can send messages and receive data, including program code, through the network(s), network link 720 and network interface 718. In the Internet example, a server 730 might transmit a requested code for an application program through Internet 728, ISP 726, local network 722 and network interface 718. The received code can be executed by processor 704 as it is received, and/or stored in storage device 710, or other non-volatile storage for later execution.

5.0 Extensions and Alternatives

In the foregoing specification, implementations have been described with reference to numerous specific details that can vary from implementation to implementation. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
accessing, by one or more computers, information about event logs that correspond to the event logs of a particular computing device and one or more computing devices;
identifying a particular event from the accessed information;
determining a hash value of a file or a process associated with the particular event;
comparing the determined hash value with an expected hash value for the file or the process;
comparing, by one or more computers, the accessed information for the particular event from the particular computing device with the accessed information for the particular event from the one or more computing devices;
determining that the particular event is an unusual event based on results of comparing the accessed information for the particular event from the particular computing device with the accessed information for the particular event from the one or more computing devices and of comparing the determined hash value with an expected hash value for the file or the process;
accessing, from a database, one or more risk factors for a malware attack on a computing device;
comparing the unusual event against the accessed risk factors;
determining, based on results of comparing the unusual event against the accessed risk factors, whether the unusual event satisfies at least one of the risk factors; and
verifying whether the unusual event is the malware attack when at least one of the risk factors is satisfied.

2. The method of claim 1, wherein comparing the accessed information for the particular event from the particular computing device with the accessed information for the particular event from the one or more computing devices comprises comparing a number of times the particular event occurs in the particular computing device with a number of times other events occur in the particular computing device.

3. The method of claim 1, wherein comparing the accessed information for the particular event from the particular computing device with the accessed information for the particular event from the one or more computing devices comprises comparing a number of times the particular event occurs in the particular computing device with a number of times the particular event occurs in the other computing devices.

4. The method of claim 1, wherein verifying whether the unusual event is a malware attack comprises:
assigning a risk rating count to account for a number of the risk factors for the unusual event;
determining if the unusual event satisfies at least a threshold amount of the risk rating count for the number of the risk factors;
associating information for the unusual event with a malware attack based on the determination that the risk rating count satisfies at least the threshold amount; and
determining whether the unusual event is not the malware attack based on the associated information.

5. The method of claim 4, further comprising:
receiving information for the threshold amount; and
enabling the threshold amount to be a variable threshold amount.

6. The method of claim 4, further comprising:
receiving, through a graphical user interface (GUI), a user input for varying the threshold amount for the computing device; and
determining that the threshold amount is to be varied based on the received user input.

7. The method of claim 1, wherein the verifying comprises:
assigning a risk rating corresponding to the unusual event;
determining whether the unusual event in the stored event logs satisfies one of the risk factors;
adjusting the risk rating based on whether the risk factor is satisfied;
determining if the unusual event satisfies at least a threshold for the risk rating for the malware attack;
determining that the unusual event is the malware attack based upon satisfying at least the threshold; and
determining that the unusual event is not the malware attack based upon not satisfying the threshold.

8. The method of claim 7, wherein adjusting the risk rating comprises:
increasing the risk rating based upon the determination that the risk factor is satisfied; and
decreasing the risk rating based upon the determination that the risk factor is not satisfied.

9. The method of claim 7, further comprising adjusting the risk rating based on whether each of the respective risk factors is satisfied.

10. The method of claim 1, wherein the unusual event comprises an unusual sequence of events.

11. A non-transitory computer-readable medium including one or more sequences of instructions which, when executed by one or more processors, causes:
accessing, by one or more computers, information about event logs that correspond to the event logs of a particular computing device and one or more computing devices;
identifying a particular event from the accessed information;
determining a hash value of a file or a process associated with the particular event;
comparing the determined hash value with an expected hash value of the file or the process;
comparing, by one or more computers, the accessed information for the particular event from the particular computing device with the accessed information for the particular event from the one or more computing devices;
determining that the particular event is an unusual event based on results of comparing the accessed information for the particular event from the particular computing device with the accessed information for the particular event from the one or more computing devices and of comparing the determined hash value with an expected hash value of the file or the process;
accessing, from a database, one or more risk factors for a malware attack on a computing device;
comparing the unusual event against the accessed risk factors;
determining, based on results of comparing the unusual event against the accessed risk factors, whether the unusual event satisfies at least one of the risk factors; and
verifying whether the unusual event is the malware attack when at least one of the risk factors is satisfied.

12. The non-transitory computer-readable medium of claim 11, wherein the instructions that cause comparing the accessed information for the particular event from the particular computing device with the accessed information for the particular event from the one or more computing devices comprises comparing a number of times the particular event occurs in the particular computing device with a number of times other events occur in the particular computing device.

13. The non-transitory computer-readable medium of claim 11, wherein the instructions that cause comparing the accessed information for the particular event from the particular computing device with the accessed information for the particular event from the one or more computing devices comprises comparing a number of times the particular event occurs in the particular computing device with a number of times the particular event occurs in the other computing devices.

14. The non-transitory computer-readable medium of claim 11, wherein the instructions that cause verifying whether the unusual event is a malware attack comprise instructions that cause:
assigning a risk rating count to account for a number of the risk factors for the unusual event;
determining if the unusual event satisfies at least a threshold amount of the risk rating count for the number of the risk factors;
associating information for the unusual event with a malware attack based on the determination that the risk rating count satisfies at least the threshold amount; and
determining whether the unusual event is not the malware attack based on the associated information.

15. The non-transitory computer-readable medium of claim 14, wherein the instructions include instructions that cause:
receiving information for the threshold amount; and
enabling the threshold amount to be a variable threshold amount.

16. The non-transitory computer-readable medium of claim 14, wherein the instructions include instructions that cause:
receiving, through a graphical user interface (GUI), a user input for varying the threshold amount for the computing device; and
determining that the threshold amount is to be varied based on the received user input.

17. The non-transitory computer-readable medium of claim 11, wherein the instructions that cause verifying comprise instructions that cause:
assigning a risk rating corresponding to the unusual event;
determining whether the unusual event in the stored event logs satisfies one of the risk factors;
adjusting the risk rating based on whether the risk factor is satisfied;

determining if the unusual event satisfies at least a threshold for the risk rating for the malware attack;
determining that the unusual event is the malware attack based upon satisfying at least the threshold; and
determining that the unusual event is not the malware attack based upon not satisfying the threshold.

18. The non-transitory computer-readable medium of claim 17, wherein the instructions that cause adjusting the risk rating comprise instructions that cause:
increasing the risk rating based upon the determination that the risk factor is satisfied; and
decreasing the risk rating based upon the determination that the risk factor is not satisfied.

19. The non-transitory computer-readable medium of claim 17, wherein the instructions include instructions that cause adjusting the risk rating based on whether each of the respective risk factors is satisfied.

20. The non-transitory computer-readable medium of claim 11, wherein the unusual event comprises an unusual sequence of events.

21. A system comprising:
one or more processors; and
a non-transitory computer-readable medium including one or more sequences of instructions which, when executed by the one or more processors, causes:
accessing, by one or more computers, information about event logs that correspond to the event logs of a particular computing device and one or more computing devices;
identifying a particular event from the accessed information;
determining a hash value of a file or a process associated with the particular event;
comparing the determined hash value with an expected hash value of the file or the process;
comparing, by one or more computers, the accessed information for the particular event from the particular computing device with the accessed information for the particular event from the one or more computing devices;
determining that the particular event is an unusual event based on results of comparing the accessed information for the particular event from the particular computing device with the accessed information for the particular event from the one or more computing devices and of comparing the determined hash value with an expected hash value of the file or the process;
accessing, from a database, one or more risk factors for a malware attack on a computing device;
comparing the unusual event against the accessed risk factors;
determining, based on results of comparing the unusual event against the accessed risk factors, whether the unusual event satisfies at least one of the risk factors; and
verifying whether the unusual event is the malware attack when at least one of the risk factors is satisfied.

22. The system of claim 21, wherein the instructions that cause comparing the accessed information for the particular event from the particular computing device with the accessed information for the particular event from the one or more computing devices comprises comparing a number of times the particular event occurs in the particular computing device with a number of times other events occur in the particular computing device.

23. The system of claim 21, wherein the instructions that cause comparing the accessed information for the particular event from the particular computing device with the accessed information for the particular event from the one or more computing devices comprises comparing a number of times the particular event occurs in the particular computing device with a number of times the particular event occurs in the other computing devices.

24. The system of claim 21, wherein the instructions that cause verifying whether the unusual event is a malware attack comprise instructions that cause:
assigning a risk rating count to account for a number of the risk factors for the unusual event;
determining if the unusual event satisfies at least a threshold amount of the risk rating count for the number of the risk factors;
associating information for the unusual event with a malware attack based on the determination that the risk rating count satisfies at least the threshold amount; and
determining whether the unusual event is not the malware attack based on the associated information.

25. The system of claim 24, wherein the instructions include instructions that cause:
receiving information for the threshold amount; and
enabling the threshold amount to be a variable threshold amount.

26. The system of claim 24, wherein the instructions include instructions that cause:
receiving, through a graphical user interface (GUI), a user input for varying the threshold amount for the computing device; and
determining that the threshold amount is to be varied based on the received user input.

27. The system of claim 21, wherein the instructions that cause verifying comprise instructions that cause:
assigning a risk rating corresponding to the unusual event;
determining whether the unusual event in the stored event logs satisfies one of the risk factors;
adjusting the risk rating based on whether the risk factor is satisfied;
determining if the unusual event satisfies at least a threshold for the risk rating for the malware attack;
determining that the unusual event is the malware attack based upon satisfying at least the threshold; and
determining that the unusual event is not the malware attack based upon not satisfying the threshold.

28. The system of claim 27, wherein the instructions that cause adjusting the risk rating comprise instructions that cause:
increasing the risk rating based upon the determination that the risk factor is satisfied; and
decreasing the risk rating based upon the determination that the risk factor is not satisfied.

29. The system of claim 27, wherein the instructions include instructions that cause adjusting the risk rating based on whether each of the respective risk factors is satisfied.

30. The system of claim 21, wherein the unusual event comprises an unusual sequence of events.

* * * * *